United States Patent [19]

Milberger et al.

[11] 4,052,884

[45] Oct. 11, 1977

[54] METHOD AND APPARATUS FOR DETERMINING STRAIN DATA DURING PILING

[75] Inventors: Lionel John Milberger, Bryan; Richard Allen Zimmer, College Station, both of Tex.

[73] Assignee: The British Petroleum Company Limited, London, England

[21] Appl. No.: 661,374

[22] Filed: Feb. 25, 1976

[51] Int. Cl.² ............................................. G01L 5/00
[52] U.S. Cl. ............................................ 73/12; 73/84; 340/270
[58] Field of Search ................ 73/88.5 R, 11, 84, 12, 73/88 E; 340/207 R

[56] References Cited

U.S. PATENT DOCUMENTS

| 3,156,910 | 11/1964 | Tarbutton | 340/207 R UX |
| 3,535,919 | 10/1970 | Budlong et al. | 73/84 |
| 3,668,673 | 6/1972 | Adler | 340/207 R X |
| 3,719,891 | 3/1973 | Lee | 340/207 R X |
| 3,824,857 | 7/1974 | Smith | 340/207 R X |

Primary Examiner—Jerry W. Myracle
Attorney, Agent, or Firm—Morgan, Finnegan, Pine, Foley & Lee

[57] ABSTRACT

Method and apparatus for determining strain data during piling in which a strain gauge transducer mounted to the pile is excited with alternating current signals. The output of the transducer is sensed, amplified and demodulated to produce signals proportional to strain. The demodulated signals are used to control a voltage controlled oscillator whose output is transmitted by a telemetry transmitter via an antenna mounted to the pile. The signals are received at a remote location, converted back to strain proportional signals and recorded. An accelerometer mounted to the pile may be used to remotely turn on the equipment for a predetermined period. The arrangement is particularly suitable for use when piling offshore.

11 Claims, 7 Drawing Figures

METHOD AND APPARATUS FOR DETERMINING STRAIN DATA DURING PILING

The invention relates to methods and apparatus for determining strain data during piling, more particularly although not exclusively, for determining such data remotely during offshore piling.

In known methods and apparatus for obtaining strain data during piling when strain gauges are attached to a steel pile, which is being driven, and connected to a normal direct current exciting signal and conditioner, the electrical output produced is a function of the strain level present beneath the strain gauges plus certain self-generating responses. These self-generating responses which are not due to resistive changes in the strain gauges are due among other things to the velocity of the strain gauge bridge through magnetic fields which may be present, their strengths, enclosed loop areas and instantaneous magnetisation properties of the pile material under high stress levels. Hence the data produced by such known methods can be highly erroneous.

Furthermore, when piling in offshore locations it is often difficult or impossible to carry out such piling with cables carrying strain data from strain gauges located on the pile to a barge from which the piling is being carried out. In many instances such piling has to be carried out without any strain data being determined. This can be extremely expensive since safety factors have to be upgraded in the absence of reliable data.

It is an object of the present invention to alleviate the above disadvantages and allow accurate strain data to be determined from a remote location.

According to one aspect of the invention there is provided a method of determining strain data during piling comprising the steps: mounting a strain gauge transducer directly to a pile; exciting the strain gauge transducer with alternating current signals; sensing the output of the strain gauge transducer during piling; amplifying the sensed output from the strain gauge transducer; demodulating the amplified sensed output so as to produce demodulated signals in which voltage is proportional to strain; utilising said demodulated signals to control the output of a voltage controlled oscillator; feeding the output from the voltage controlled oscillator to a telemetry transmitter, and feeding the output from the telemetry transmitter to an antenna mounted directly to said pile.

The method may further comprise receiving the signals transmitted from said antenna; amplifying said received signals; feeding said amplified received signals through a discriminator; filtering said discriminated signals to produce signals in which voltage is proportional to strain, and producing a record of said filtered signals.

The method may also include mounting an accelerometer directly to the pile; amplifying an output from the accelerometer produced as a result of piling; utilising said amplified output to actuate a timer circuit; utilising the output from the timer circuit to actuate a circuit for producing said alternating current exciting signals and to actuate said telemetry transmitter for a predetermined duration.

The output from said timer circuit may be utilised to actuate a further timer circuit which in turn feeds a calibration signal to the strain gauge transducer for a predetermined time at the commencement of the feeding of said alternating current exciting signals to the strain gauge transducer.

The output from the accelerometer may also be fed to a further voltage controlled oscillator, the output of which is fed to said telemetry transmitter.

According to a further aspect of the invention there is provided an apparatus for determining strain data during piling, comprising a strain gauge transducer, the transducer being adapted to be mounted directly to a pile; circuit means for producing alternating current signals, said circuit means being connectable to said transducer; sensing means, said sensing means being connectable across said transducer; an amplifier, the amplifier being connected to receive any output from the sensing means; a demodulator, the demodulator being connected to receive any output from the amplifier and to produce therefrom demodulated signals in which voltage is proportional to strain; a voltage controlled oscillator, said oscillator being connected to be controlled by any output from the demodulator; a telemetry transmitter, the transmitter being connected to the output of said oscillator, and an antenna, the antenna being adapted to be attached directly to said pile and be electrically connected to the output of said transmitter.

The apparatus may also include an accelerometer, the accelerometer being adapted to be connected directly to the pile; a second amplifier, the amplifier being connectable to amplify any output from the accelerometer; a timer circuit, the timer circuit being connected to be actuated by an output from the second amplifier and being connected to actuate said circuit means and said transmitter for a predetermined duration.

In addition there may be provided a further timer circuit, the further timer circuit being connected to be actuated by said timer circuit, and calibration means, said calibration means being arranged to be connected to said transducer, by said further timer circuit, for a predetermined time at the commencement of feeding said alternating current signals to said transducer.

A second voltage controlled oscillator may be provided with its output connected to said transmitter, such second voltage controlled oscillator being alternatively connected to said demodulator or to the accelerometer.

Said circuit means may be such as to produce substantially square wave alternating current signals.

Said antenna may comprise a low profile, cavity backed, slot antenna.

The electrical circuitry may be encapsulated within a housing assembly which is adapted to be mounted by resilient web means within a pile.

The above apparatus may be used in combination with further apparatus comprising receiver means, including a further antenna, for receiving signals transmitted from said antenna; a third amplifier, said third amplifier being connected to amplify received signals; a discriminator, the discriminator being connected to the output of the third amplifier; a filter, the filter being connected to the output of the discriminator so as to produce therefrom signals in which voltage is proportonal to strain, and a display device connected to the output of the filter.

The foregoing and further features of the invention may be more readily understood from the following description of a preferred embodiment thereof, by way of example, with reference to the accompanying drawings, in which.

Figure 1:
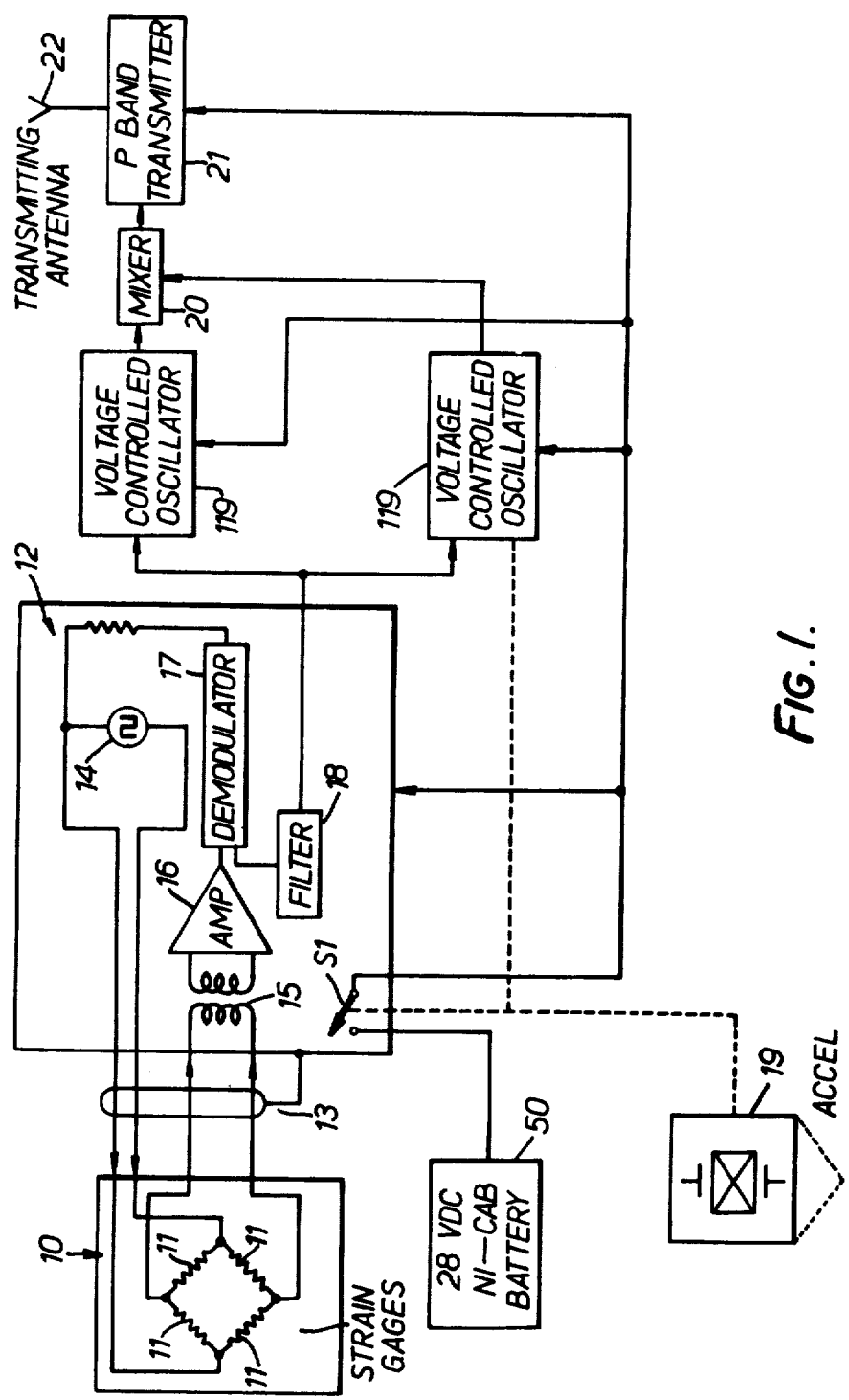
FIG. 1 is a block schematic representation of an apparatus for mounting to a pile for determining strain data.

Referring now firstly to FIG. 1 there is shown a block schematic representation of an apparatus for mounting to a pile for determining strain data. A strain gauge transducer 10 comprises resistive strain gauges 11 connected in a bridge configuration. The transducer 10 is connected to a signal conditioner 12 via a cable 13. A square wave alternating current generator 14 is connected across one side of the bridge transducer 10 so as to provide excitation therefor. The generator 14 produces a peak to peak voltage of five volts at a frequency of 10 $KH_z$. A square wave oscillator is used instead of a sine wave oscillator for several reasons: (1) the wave form is easier to generate electrically and maintain stable, (2) the filter requirements after demodulation are not stringent, and (3) the need for a capacitive balance is removed when short and well balanced input wiring is used.

The output from the strain gauge bridge 10 is connected through an input transformer 15 to a high gain preamplifier 16 having a fixed gain of 100. The signal then enters, along with the carrier frequency, a phase sensitive demodulator 17 where the strain induced signal is extracted from the carrier. A DC to 2 $KH_z$ second order filter 18 provides smoothing. The overall signal conditioner gain can be adjusted by the use of a solder-in resistor (R1, FIG. 2) which adjusts gain in the demodulator stage. This gain adjustment is desirable to accommodate different strain levels which are present on different piles and driving conditions.

A remote turn-on electronic circuitry is housed within the signal conditioner 12. A piezoelectric accelerometer 19 firmly mounted onto the pile is connected to electronic circuitry so that when 60 g's or more is present a solid state switch 51 is closed, supplying power to the transmitter and the remaining signal conditioner electronics. Timing circuitry to be described hereinafter is arranged so that once the switch 51 is closed it remains closed for approximately one minute, during which time continuous data is being transmitted. After opening, the switch is again closed by the next hammer blow for approximately a one minute period. At each switch closure a shunt calibration resistor is also automatically shunted across one of the strain gauges in the bridge to simulate a strain. This will be discussed in detail with reference to FIG. 2. Different calibration resistors can be selected as needed based on expected strain levels.

The output from filter 18 is fed to two voltage controlled oscillators 119 whose frequency can be varied from a predetermined centre frequency by an input voltage from the signal conditioner 12. In this system, a pair of voltage controlled oscillators 119 are connected in parallel so that data signal is not lost in case of a failure of one of them. The centre frequencies for the voltage controlled oscillators 119 were chosen at 32 $KH_z$ and 64 $KH_z$ with capability of being modulated in frequency plus or minus 40% from the centre frequency as the input voltage varies ± 2.5 volts from + 2.5 volts. The two output signals are then mixed linearly in a mixer 20 to form a single composite signal of sufficient magnitude to drive a transmitter 21. Such an arrangement allows the composite of the redundent voltage controlled oscillator outputs to deviate the transmitter carrier frequency of a single transmitter. Alternatively one of units 119 could be connected to accelerometer 19 to to provide additional data.

The trasmitter 21 can be broken down into three major parts. A crystal controlled oscillator is used to produce a highly stable carrier frequency which is virtually immune to frequency drift associated with shock and temperature extremes. The second portion is a modulator which deviates the carrier frequency proportional to the output signal from the mixer 20. This method of modulation is referred to as frequency modulation (FM) or phase modulation. Since the signal generated by the oscillator is of very low power, a power amplifier is needed to boost the power to a level sufficiently high to drive an antenna 22.

Figure 2:
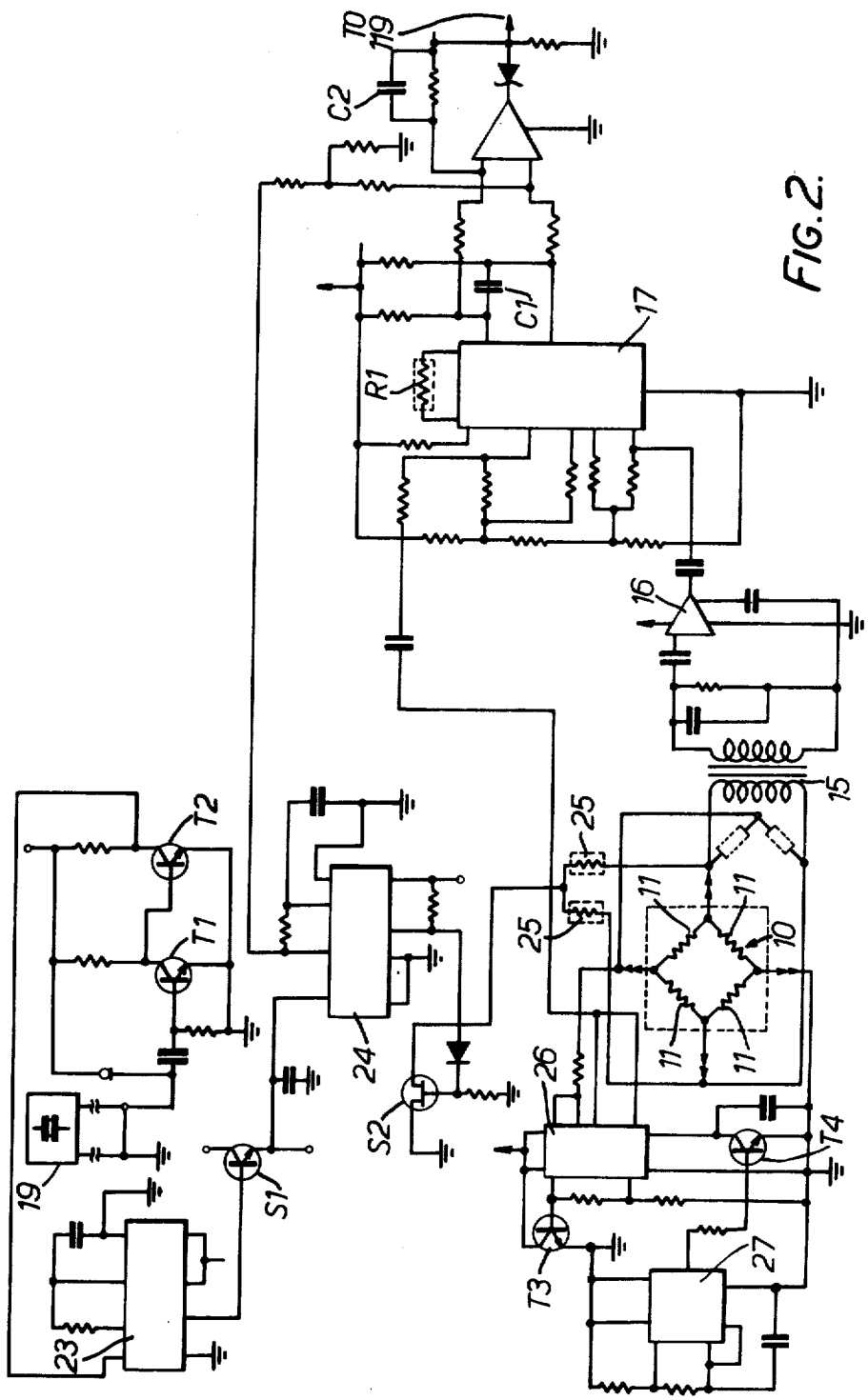
FIG. 2 is a circuit diagram of a part of the apparatus of FIG. 1.

Referring now to FIG. 2 the output from accelerometer 19 is fed via two transistors T1 and T2, which amplify the output signal, to actuate a timer circuit 23 which produces an output for one minute. The circuit 23 actuates power switch S1 which in turn actuates a further timer circuit 24 which produces an output for five seconds. The circuit 24 actuates a field effect transistor switch S2 to connect calibration resistors 25 across the strain gauge bridge 10 for the five second duration. The power switch S1 in addition to actuating circuit 24 also switches on the square wave generator 14 and the transmitter 21.

The square wave generator 14 comprises a D.C. regulator 26, a current boost transistor T3, a timer circuit 27 providing the 10 $KH_z$ on/off signal and a driver transistor T4 for driving the timer circuit 27 and providing inversion.

The filter 18 is provided by capacitors C1 and C2 with amplifier 28 which provides biasing and a single ended output to voltage controlled oscillators 119.

Figure 3:
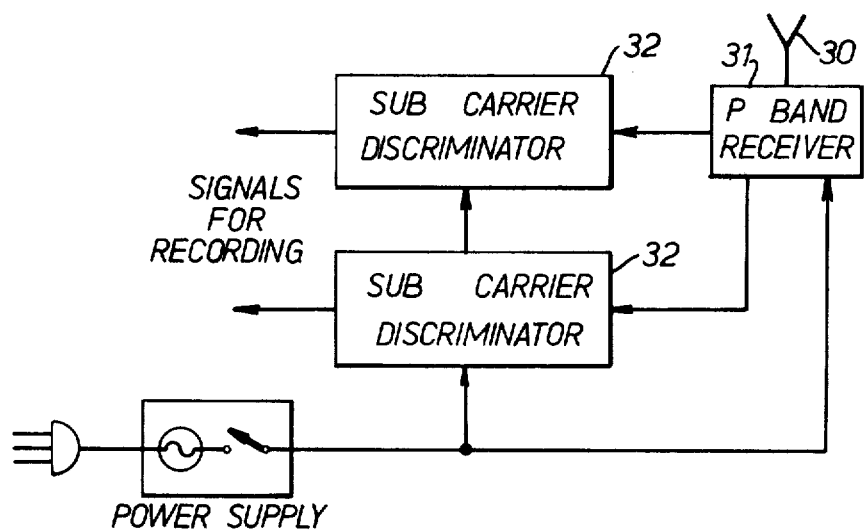
FIG. 3 is a block schematic representation of a receiver for utilising data transmitted from the apparatus of FIG. 1.

Referring now to FIG. 3 there is shown a circuit for receiving and utilizing the signals transmitted from antenna 22 (FIG. 1).

A receiving antenna 30 is of a simple coaxial design with a ¼ wave length, 13 inch radiator and 13 inch ground shield. Mounting is accomplished by means of ⅜ inch pipe threaded onto a stainless steel tube. All exposed metal parts are plated for weather resistance. The signal is detected by the antenna 30 and fed through standard coaxial cable to a receiver 31. The length of the cable should be restricted to about 100 feet because of losses encountered.

The receiver 31 is a frequency modulated (FM) type receiver permanently set at the frequency of the transmitter (219.500 $MH_3$). Incorporated in the receiver 31 is a squelch circuit that disables the output if either no signal is received or the received signal is too weak for favorable signal to noise ratio. Since an FM mode of modulation is used, rejection of unwanted signals and static is very high, such as that produced by electrical arc welding equipment.

The multiplexed signal from the receiver 31 is fed to two parallel connected discriminators 32 which demodulates each of the modulated subcarrier frequencies and produce an output signal proportional to the original signal. The discriminators 32 contain both zero offset and gain controls for use in setting up the recording instrumentation. The zero control adjusts the output voltage to zero volts with the subcarrier at centre frequency or a zero data condition. The gain adjusts the magnitude of the data or strain to a reasonable level for recording. A DC to 2 KH$_z$ output filter is contained in each discriminator 32 to greatly diminish all frequencies outside this band including the subcarrier frequency, thus improving the signal to noise ratio. The output of the discriminators 32 are connected to standard recording or display devices (not shown).

Figure 4:
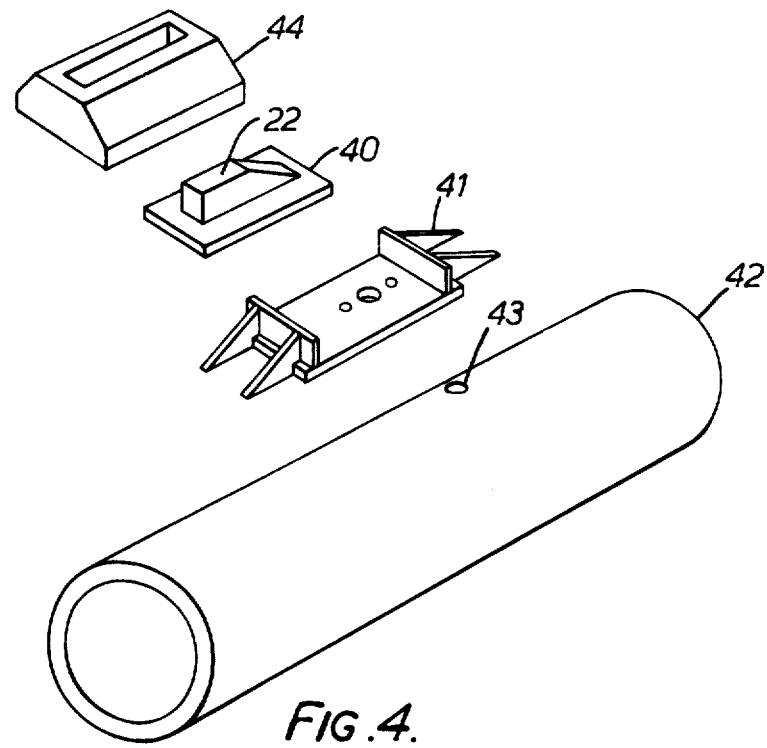
FIG. 4 is an exploded perspective view of an antenna for use with the apparatus of FIGS. 1 and 2.

Referring now to FIG. 4 there is shown an exploded perspective view of an antenna assembly suitable for use as transmitting antenna 22. The antenna 22 is mounted on a sub plate 40 which in turn is mounted on a base plate 41 for attachment to a pile 42, for example by welding. A hole 43 is formed in the pile to facilitate electrical connection to antenna 22. The antenna 22 is protected by a protective cover 44 of synthetic plastics which locates on base plate 41.

Figure 5:
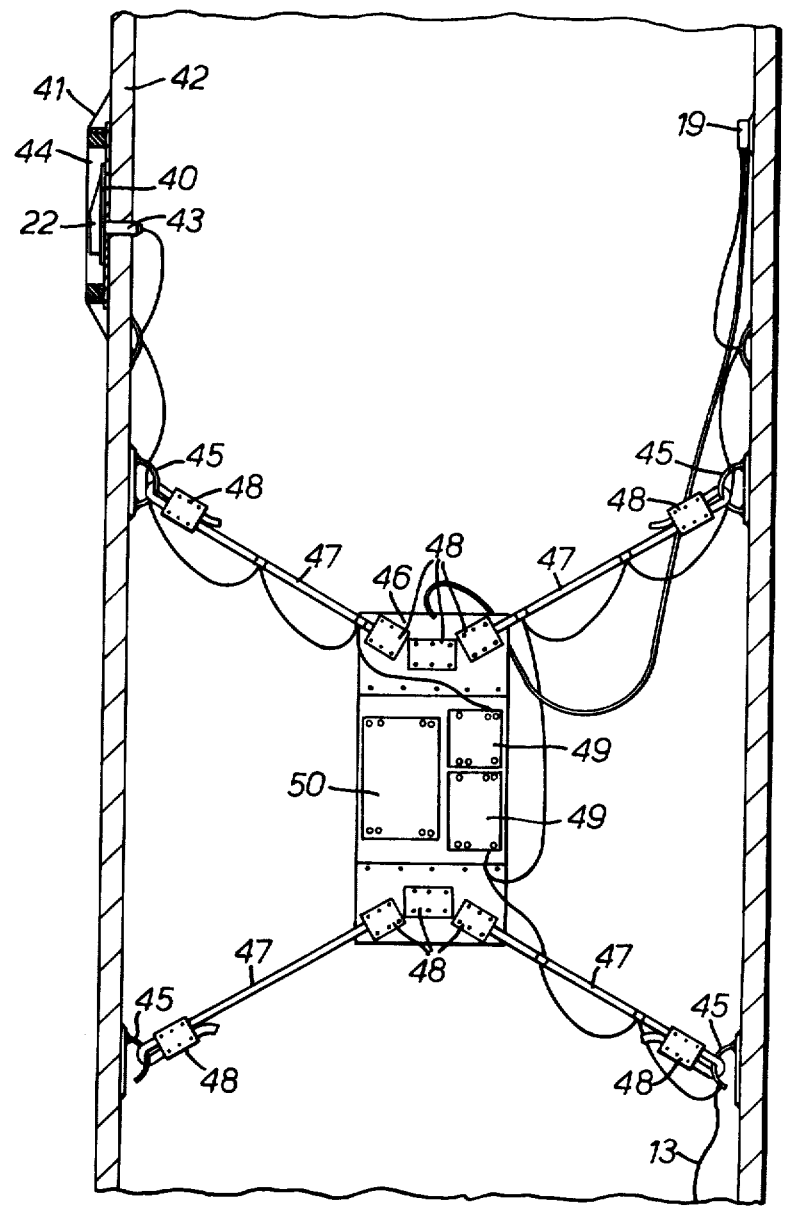
FIG. 5 is a side sectional view through a pile showing the apparatus of FIGS. 1 and 2 mounted thereto.

FIG. 5 shows a section through pile 42 and shows antenna 22 located on the external surface thereof. The accelerometer 19 is shown attached to the internal surface of pile 42. Four hook members 45 are welded to the internal surface of pile 42 and serve to carry a mounting plate 46 by means of four resilient webs 47 clamped thereto by clamps 48. The mounting plate 46 carries the circuitry shown in FIG. 1 housed and encapsulated in two housings 49 and also carries a rechargeable nickle cadmium battery 50. The section of pile 42 is a pile extension member which is attached to the top of a pile prior to driving. The strain gauges 11 are attached to the internal surface of the actual pile to be driven and electrically connected by the cable 13.

Figure 6:
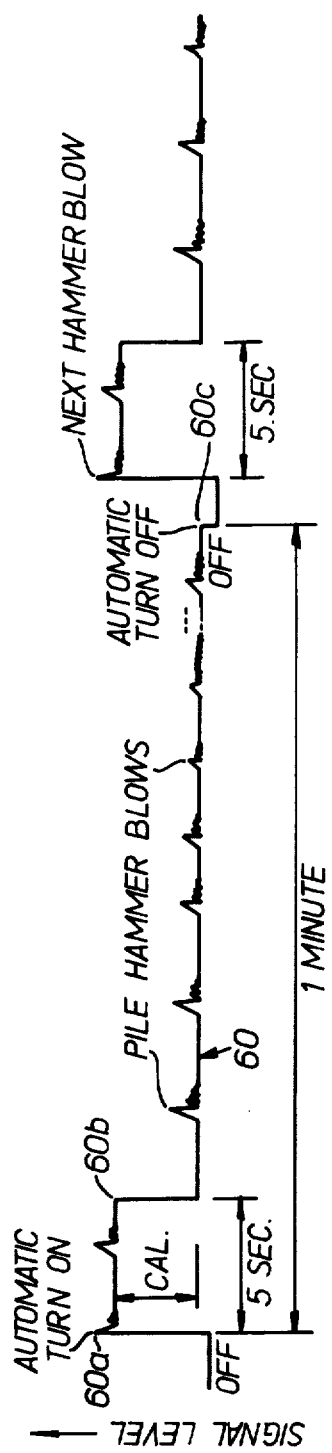
FIG. 6 is a waveform showing the sequence of operation of the apparatus of FIGS. 1 and 2.

Hence with the apparatus located on a pile to be driven the first hammer blow causes accelerometer 19 to turn on the electronics, as described in detail with respect to FIG. 2. FIG. 6 shows this by waveform 60 where at point 60a the apparatus is turned on, at point 69b, after 5 seconds, the calibration is turned off and point 60c, after one minute the whole equipment is turned off. Assuming driving continues the next hammer blow starts the next cycle of operation and such cycles continue until driving ceases.

In this way the equipment provides continuous calibration signals to enable easy evaluation of recorded data and at the same time ensures that current is only drawn from battery 50 during driving of a pile so reducing down time of the equipment for recharging battery 50. No cable connections are required between the pile and the data recording equipment so facilitating easy utilisation when piling at offshore locations. Furthermore by use of the alternating current signal conditioner 12 the data obtained gives accurate indications of actual strain.

Figure 7:
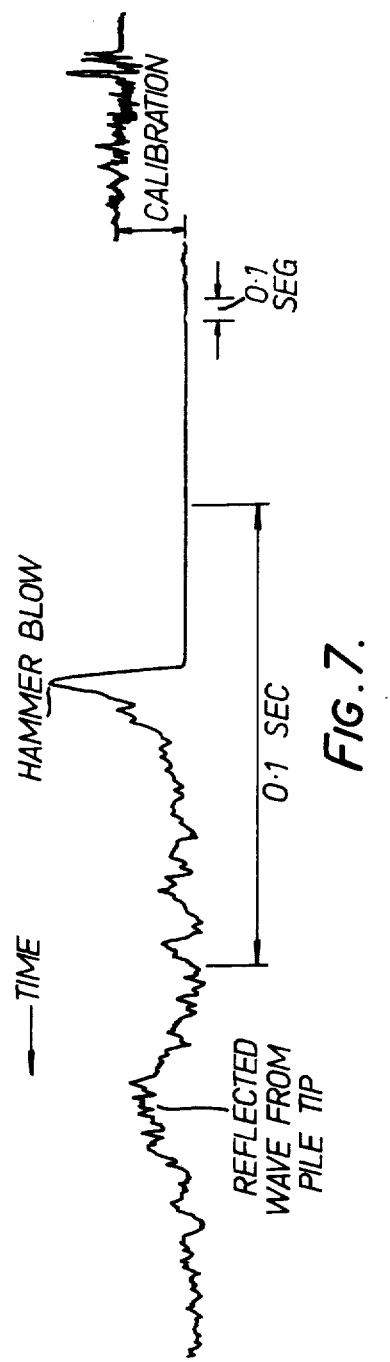
FIG. 7 is a reproduction of a portion of an actual data record obtained during testing of an apparatus as shown in FIGS. 1, 2 and 3.

A prototype apparatus as illustrated has been built and tested and FIG. 7 shows a copy of a portion of actual data recorded on an increased scale compared with FIG. 6.

What is claimed is:

1. A method of determining strain data during piling comprising the steps:
   a. mounting a strain gauge transducer directly to a pile;
   b. exciting the strain gauge transducer with alternating current signals;
   c. sensing the output of the strain gauge transducer during piling;
   d. amplifying the sensed output from the strain gauge transducer;
   e. demodulating the amplified sensed output so as to produce demodulated signals in which voltage is proportional to strain;
   f. utilising said demodulated signals to control the output of a voltage controlled oscillator;
   g. feeding the output from the voltage controlled oscillator to a telemetry transmitter, and
   h. feeding the output from the telemetry transmitter to an antenna mounted directly to said pile.

2. A method as claimed in claim 1, comprising the further steps:
   a. receiving the signals transmitted from said antenna;
   b. amplifying said received signals;
   c. feeding said amplifier received signals through a discriminator;
   d. filtering said discriminated signals to produce signals in which voltage is proportional to strain, and
   e. producing a record of said filtered signals.

3. A method as claimed in claim 1 comprising the further steps:
   a. mounting an accelerometer directly to the pile;
   b. amplifying an output from the accelerometer produced as a result of piling;
   c. utilising said amplified output to actuate a timer circuit;
   d. utilizing the output from the timer circuit to actuate a circuit for producing said alternating current exciting signals and to actuate said telemetry transmitter for a predetermined duration.

4. A method as claimed in claim 3 wherein the output from said timer circuit is utilised to actuate a further timer circuit which in turn feeds a calibration signal to the strain gauge transducer for a predetermined time at the commencement of the feeding of said alternating current exciting signals to the strain gauge transducer.

5. A method as claimed in claim 3 wherein the output from the accelerometer is also fed to a further voltage controlled oscillator, the output of which is fed to said telemetry transmitter.

6. A method as claimed in claim 3 wherein all the apparatus of performing the method, except the strain gauge transducer and accelerometer and up to the point of passing the output from the telemetry transmitter to the antenna, is encapsulated in a housing means, which housing means is suspended from resilient web means within the pile.

7. An apparatus for determining strain data during piling, comprising:
   a. a strain gauge transducer, the transducer being adapted to be mounted directly to a pile;
   b. circuit means for producing alternating current signals, said circuit means being connected to said transducer;
   c. sensing means, said sensing means being connected across said transducer;
   d. an amplifier, the amplifier being connected to receive any output from the sensing means;
   e. a demodulator, the demodulator being connected to receive any output from the amplifier and to produce therefrom demodulated signals in which voltage is proportional to strain;
   f. a voltage controlled oscillator, said oscillator being connected to be controlled by any output from the demodulator;

g. a telemetry transmitter, the transmitter being connected to the output of said ocillator;
h. an antenna, the antenna being adapted to be attached directly to said pile and be electrically connected to the output of said transmitter;
i. an accelerometer, the accelerometer being adapted to be connected directly to the pile;
j. a second amplifier, the amplifier being connected to amplify any output from the accelerometer; and
k. a timer circuit, the timer circuit being connected to be actuated by an output from the second amplifier and being connected to actuate said circuit means and said transmitter for a predetermined duration.

8. An apparatus as claimed in claim 7 further comprising:
a. a further timer circuit, the further timer circuit being connected to be actuated by said timer circuit, and
b. calibration means, said calibration means being arranged to be connected to said transducer, by said further timer circuit, for a predetermined time at the commencement of feeding said alternating current signals to said transducer.

9. An apparatus as claimed in claim 7 further comprising a second voltage controlled oscillator connected at its output to said transmitter, the second voltage controlled oscillator being alternatively connected to said demodulator or to the accelerometer.

10. An apparatus as claimed in claim 7 wherein said antenna comprises a low profile cavity backed, slot antenna.

11. An apparatus as claimed in claim 7 wherein said circuit means, sensing means, amplifier, demodulator, voltage controlled oscillator, transmitter, second amplifier and timer circuit are all encapsulated within housing assembly means which is adapted to be mounted by resilient web means within a pile.

* * * * *